United States Patent [19]

Watkins

[11] Patent Number: 4,533,476

[45] Date of Patent: Aug. 6, 1985

[54] SPA FILTER INSTALLATION METHOD AND MEANS

[75] Inventor: Jonathan Watkins, San Marcos, Calif.

[73] Assignee: Watkins Manufacturing Co., Carlsbad, Calif.

[21] Appl. No.: 614,127

[22] Filed: May 25, 1984

[51] Int. Cl.$^3$ ........................... E04H 3/20; C02F 1/00

[52] U.S. Cl. .................................... 210/805; 210/169; 210/196; 210/238; 210/416.2; 210/447; 210/453

[58] Field of Search ..................... 4/488, 492, 506–508; 210/167, 169, 196, 232, 238, 251, 416.2, 434, 210/441, 445, 447, 448, 450, 451, 453, 455, 460, 462, 210/463, 493.2, 497.01, 790, 805

[56] References Cited

U.S. PATENT DOCUMENTS

| | | | |
|---|---|---|---|
| 1,748,129 | 2/1930 | Hughes . | |
| 2,673,100 | 3/1954 | Shumaker . | |
| 2,757,800 | 8/1956 | Kucera | 210/450 X |
| 2,783,893 | 3/1957 | Romanoff | 210/169 X |
| 2,822,201 | 2/1958 | Wood | 210/238 X |
| 3,227,475 | 1/1966 | Sinkinson . | |
| 3,240,342 | 3/1966 | Callahan, Jr. et al. | 210/447 X |
| 3,240,346 | 3/1966 | Callahan, Jr. et al. | 210/448 |
| 3,327,858 | 6/1967 | Eddy et al. | 210/448 X |
| 3,447,687 | 6/1969 | Canterbury | 210/447 X |
| 4,142,337 | 3/1979 | Holcomb | 4/492 X |
| 4,233,694 | 11/1980 | Janosko et al. | 210/169 X |
| 4,416,775 | 11/1983 | Halbich et al. | 210/236 |
| 4,426,286 | 1/1984 | Puckett et al. | 210/169 X |

*Primary Examiner*—Robert Spitzer

*Attorney, Agent, or Firm*—Duane C. Bowen

[57] ABSTRACT

Spa recirculation water filter installation having an upwardly, inwardly open recess in the plastic spa water reservoir molded in a similar recess in a female mold. Water outlet fittings in opposite walls of the recess connected in a T-manner to a recirculation water pump. A filter having in each end a fitting interengaging with the water outlet fittings to secure the filter in place. A compression spring in one filter end fitting to be compressed during engagement and disengagement of the filter end fittings with the water outlet fittings. A cover over the filter installation with flanges secured to the filter end fittings.

12 Claims, 5 Drawing Figures

Fig. 3
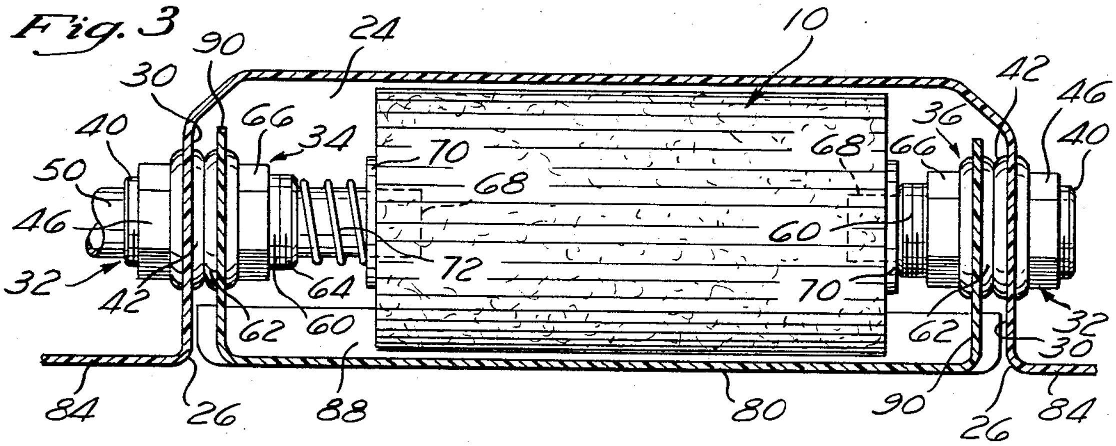
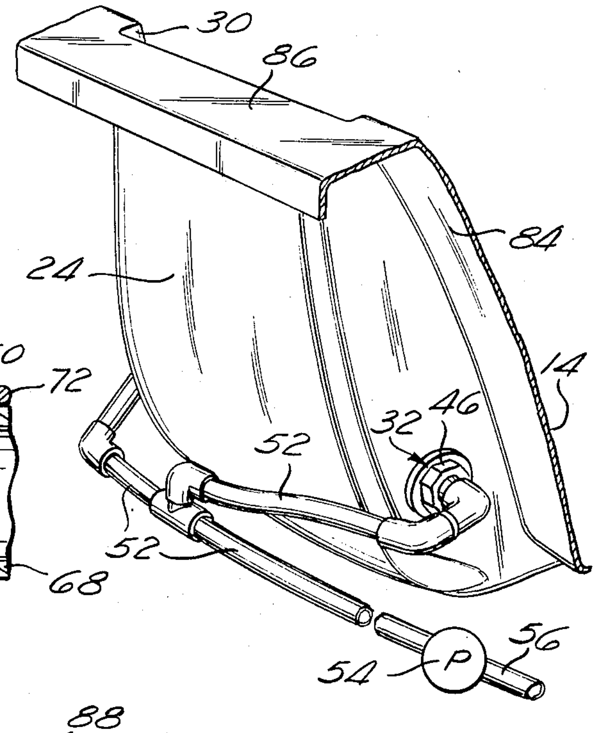
Fig. 5
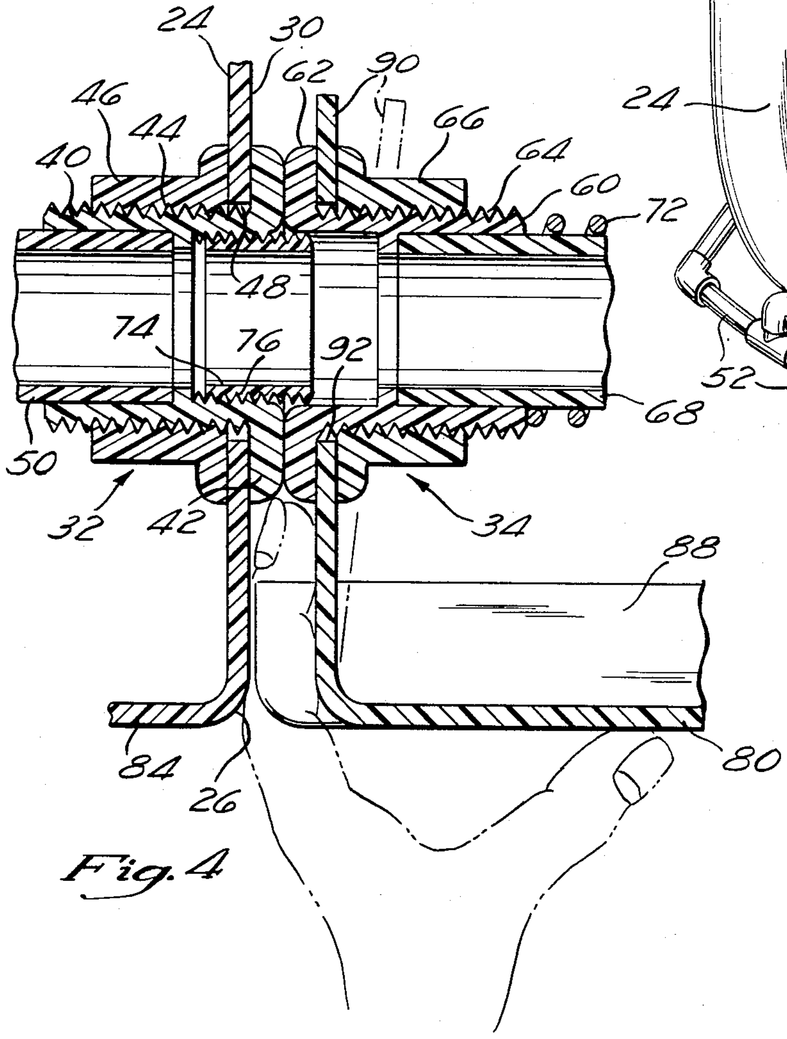
Fig. 4

SPA FILTER INSTALLATION METHOD AND MEANS

BRIEF SUMMARY OF THE INVENTION, BACKGROUND AND OBJECTIVES

My invention relates to an improved way to install a recirculation water filter in an enclosure in a plastic spa.

In the past, recirculation water filters have been installed in plastic spas by constructing essentially a box enclosure or the like as a separate step from molding the spa. It will be understood that the basic job of constructing a box or the like is time consuming. It is an objective of my invention to provide a satisfactory recirculation filter enclosure primarily by a cavity molded as part of the spa molding process and without manual fabrication.

Further objectives of my invention include: (a) to improve the appearance of a filter installation by correspondence between the molding of the spa and the molding of the filter-receiving recess as a part thereof, (b) to improve spa sanitation and to make cleaning easier by the molding of a rounded filter-receiving recess instead by fabricating a box structure with difficult to clean corners, and (c) to provide for ease of installation and removal of the recirculating water filter.

My invention will be best understood, with additional objectives and advantages thereof, when read with reference to the drawings.

THE DRAWINGS

FIG. 1 is a perspective view of a spa including a specific embodiment of my filter installation method and means. In this view, the filter is enclosed by a cover.

FIG. 2 is an enlarged partial perspective view of the filter receiving spa recess. The cover is shown in exploded disposition and the filter is omitted. A female mold, used in molding the spa, is represented in dashed lines.

FIG. 3 is an enlarged view, partly in section, taken on line 3—3 of FIG. 1.

FIG. 4 is viewed, largely in section, in the same orientation as FIG. 3 but showing only part of the same structure and on considerably enlarged scale. The positioning of the hand in cover removal is indicated.

FIG. 5 is a perspective view of the rear side of the filter-receiving recess as contrasted to the frontal view thereof in FIG. 2.

DESCRIPTION

Figure 1:
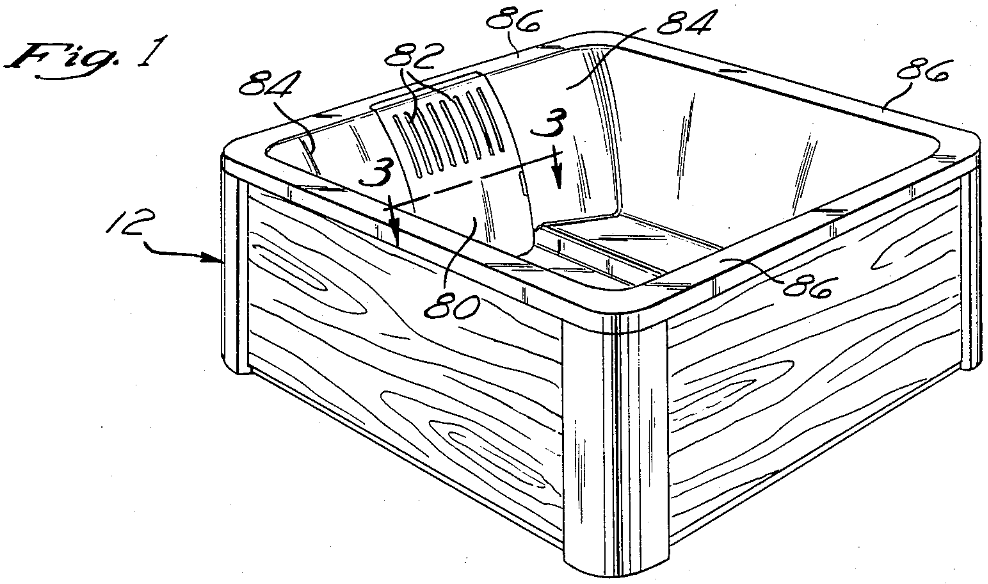

The filter 10 depicted in the drawings is a standard commercial product used for spas or pools. Such filters or filter cartridges may be formed of plastic or paper formed into a generally cylindrical shape. Actually, the sides of the filter have the form of accordian pleats (in planes passing through the axis of the cylinder) in order to provide added strength and to provide additional filtering area, as compared to a smooth cylindrical surface. Plastic end caps are common. As an example of such filter cartridges, Du Pont manufactures a line of cartrides of REEMAY spunbonded polyester. Another source of filters made from 100% polyester, blended polyester or paper is Baleco International, PO Box 11035, Cincinnati, Ohio, 45211. As these are standard products, I have not detailed the construction of filter 10 other than to implicitly indicate end axial openings to receive tubes to connect to a recirculation water pump.

Figure 2:
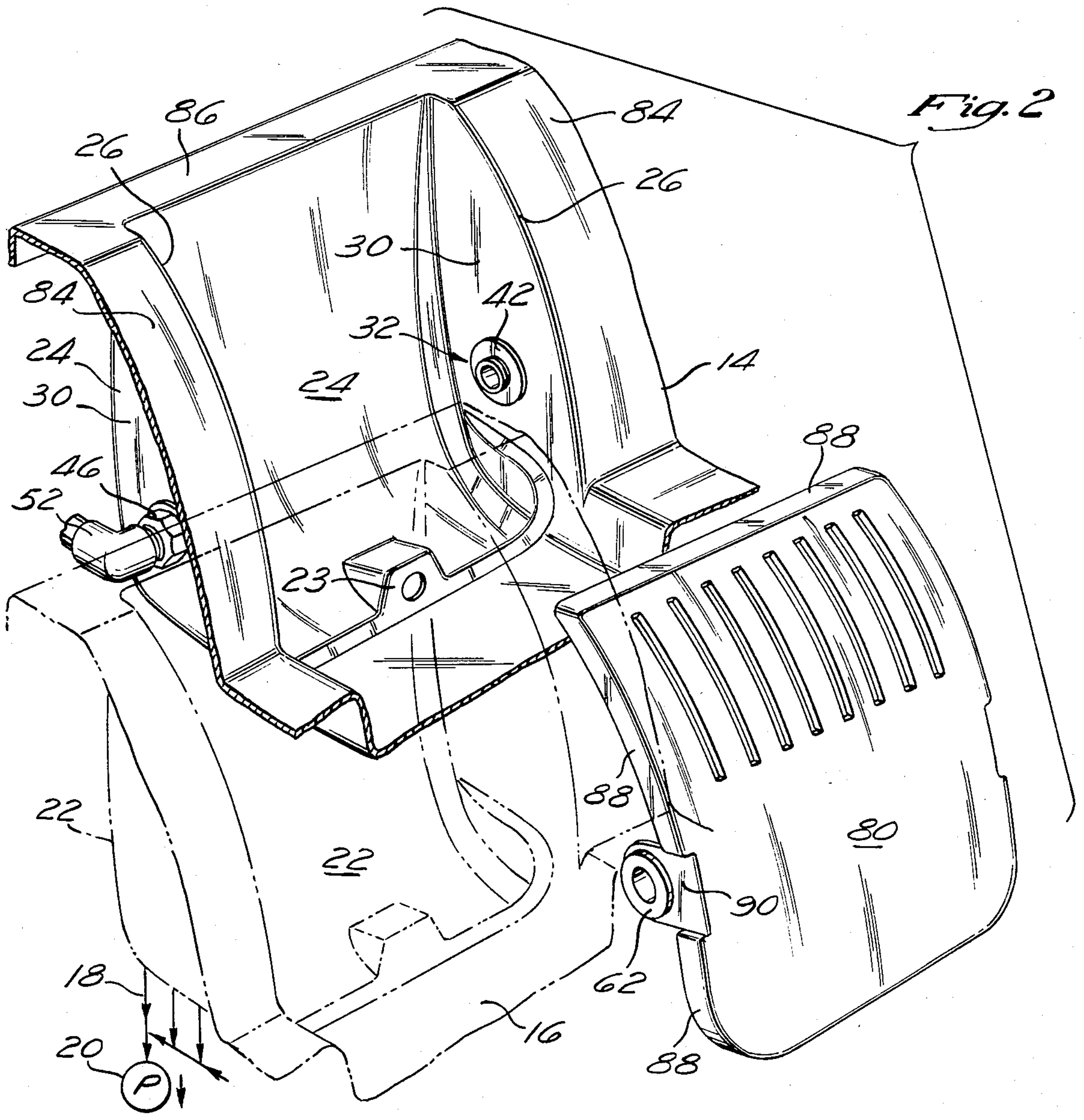

The spa 12 is intended merely to be representative of spas having water reservoirs 14 molded of plastic. In FIG. 2, a schematical representation is made in dashed lines of a female mold 16, vacuum lines 18 from the mold, and a vacuum pump 20 to pull a plastic sheet down into conformity with the contours of female mold 16. A recess 22 in mold 16 is used to form a matching filter-receiving recess 24 in the water reservoir 14 of spa 12.

As indicated above, in the past compartments for filters usually have been fabricated by hand techniques fabricating boxes. Commonly access has been from the tops of such compartments. That approach has been disadvantageous for the reasons given. Additionally, the filter box area has been difficult to handle when polyurethane is poured into female mold 16 in the molding of spa 12. The polyurethane material at first foams up and fills cavity 16.

I conceived the idea that the objectionable features of the prior filter installations could be avoided by molding the filter-receiving cavity by a recess 24 formed as a part of the general molding of water reservoir 14 in female mold 16 by providing a recess 22 in mold 16 having the shape of the desired recess 24. Female mold 16 and especially female mold recess 22 must have drafts permitting removal of reservoir 14 including recess 24 from the female mold. If the opposed sidewalls 30 of recess 24 are substantially flat and substantially parallel, there will not be a problem of release of recess area 24 of reservoir 14 from female mold recess 22. Some shrinkage of the plastic of spa 12 in curing assists in the problem of mold release.

It may be important to be concerned with the mouths of cavities 22, 24. The mouth 26 of recess 24 opening inwardly of reservoir 14, through which filter 10 must pass, in a movement directed laterally of filter 10, must be at least as wide as filter 10 is long. This should be contrasted with the tendency in some molded cavities to have lipped, reduced dimension mouth 26. A reduced dimension mouth 26 not only would be counterindicated in the problem of filter installation and removal but also in the problem of mold release. I want both simple, straightforward filter installation and removal and no problem in release of mold 16. It will be observed recess 22 is merely a simple smooth-lined extension of reservoir 14.

A drain 23, for periodic drawing of reservoir 14, is molded in the shell below the filter cartridge location as shown in FIG. 2. A closure for the drain, not shown, is external of the shell. It will be observed how the shell structure in the area of drain 23 is faired into adjacent reservoir surfaces.

A pair of horizontally aligned water outlet fittings 32 are provided in opposed sidewalls 30. Filter 10 has paired end fittings 34, 36 engaging with water outlet fittings 32. These can be made of PVC or other plastic and can use all or partly standard fitting components. Fittings 32 can be identical and each can include a sleeve 40 with an end flange 42 and external threads 44. Each also can include a flanged nut 46 engaged with threads 44. Sidewalls 30 have openings 48 through which sleeves 40 extend and sidewalls 30 are sandwiched between the flanges of sleeve 40 and nut 46. Internal seats in sleeves 40 receive tubes 50 which connect through lines 52 fabricated from elbows, flexible tubes, a Tee, etc., with a recirculation water pump 54 which has an outlet line 56 returning filtered water to reservoir 14. See especially FIGS. 3, 4 and 5 for these components. It will be apparent the filtering system could operate with only one active water outlet 32. One reason to have two active outlets 32 is that if only one outlet 32 were provided, a part of the body such as a hand could be held against the single outlet 32 by the vacuum from pump 54, i.e., in the FIG. 2 situation when the cover and filter are removed, such as during filter replacements. With two outlets 32 present, if a hand were to cover one outlet 32, little if any suction would result on the hand because the force of pump suction would merely be concentrated on the other outlet 32.

End fittings 34 and 36 have mostly common parts, namely: a sleeve 60 with an end flange 62 and with external threads 64, a flanged nut 66 engaged on sleeve 60, a tube 68 installed in a seat within sleeve 60, and an annular washer 70 abutting an end of filter 10. Whereas a compression spring 72 could be provided on both tubes 68, only one spring 72 is needed, which is shown on the left in FIG. 3. During installation or removal of filter 10, spring 72 is compressed by a hand, as shown in FIG. 4, to engage and disengage end fittings 34, 36 relative to outlet fittings 32.

End flanges 42, 62 of sleeves 40, 60 are radiused to facilitate camming past each other or past other members in engagement and disengagement of fittings 32, 34, 36. A thimble 74 is installed, preferably in sleeves 40, to provide for interengagement of fittings 32, 34, 36. Internal threads 76 are shown in sleeve 40 which the threaded thimble adjustably engages to determine how far beyond flange 42 thimble 74 extends. Thimble 74 engages in the flanged end of sleeve 60 to positively lock fittings 32, 34, 36 together. In purchasing standard parts, sleeve 60 may also have internal threads in its flanged end but they are deleted from FIG. 4 in order to avoid confusion, the point being that even if there are threads in sleeve 60, thimble 74 protrudes beyond flange 42 only far enough to engage or latch in flange 62.

A cover 80 is provided to shield filter 10 aesthetically and functionally. Slots 82 are formed in cover 80 to provide sufficient porting for water, to be filtered, entering recess 24 but cover 80 is not required to be watertight elsewhere. The cover 80 fits in the mouth 26 of recess 24 and preferably is in the same planes as the adjacent sidewalls 84 and top walls 86 of reservoir 14. Cover 80 has flanges 88 for strength. Cover 80 provides an attractive, finished look to the filter installation.

Cover 80 has longer flanges 90 with openings 92 in which sleeves 60 are positioned, flanges 90 being sandwiched between sleeve end flanges 62 and nuts 66. Flanges 90 are spaced from the sidewalls 30 of recesses 24 in the area of recess mouth 26 to permit fingers to be inserted therebetween, as illustrated in FIG. 4. The fingers are used to deflect flanges 90, as shown in dashed lines in FIG. 4. Flanges 90 must be deflected sufficiently to disengage sleeve 60 from thimble 74. The radiusing of particularly flanges 62 is important in camming sleeve 60 past thimble 74, as will be understood particularly from FIG. 4.

Having thus described my invention, I do not wish to be understood as to limiting myself for the exact construction shown and described. Instead, I wish to cover those modifications that will occur to those skilled in the art upon learning of my invention, and which are in the proper scope thereof.

I claim:

1. The method of installing an elongated recirculation water filter in a spa having a plastic water reservoir with an open top forming a bathing area, comprising:

(a) molding said plastic water reservoir in a female mold and by using vacuum drawing of the plastic of the spa into said mold, (b) forming a filter location directly within said water reservoir by forming an upwardly, inwardly open filter-receiving reservoir recess with sidewalls spaced at least as wide as said filter is long and with a mouth opening inwardly through which said filter passes in installation at least as wide as said filter is long, said recess being formed by expanding the sidwall of said reservoir in the area of said reservoir recess by forming a matching upwardly, inwardly open female mold recess with a draft permitting removal of said reservoir including said reservoir recess, (c) providing said reservoir recess with a spa water outlet in each of opposed sidewalls of said reservoir recess, said spa water outlets being generally horizontally aligned, and connecting said outlets in a T-manner to pump means connected to a return water line to said reservoir, (d) positioning said filter in said reservoir recess by insertion in a direction lateral of said filter through said mouth and connecting said filter to said spa water outlets by applying a compressive force to paired opposite outlet end of said filter and then permitting said filter to expand into engagement and connection with said spa water outlets, and (e) providing said ilter with a pervious central section between said paired opposite outlet ends whereby a filtered recirculating water stream can be drawn directly from said reservior through said pervious section and through said spa water outlets.

2. The method of installing an elongated recirculation water filter in a spa having a plastic water reservoir with an open top forming a bathing area, comprising:

(a) molding said plastic water reservoir in a female mold, (b) forming a filter location directly within said water reservoir by forming an upwardly, inwardly open filter-receiving reservoir recess with sidewalls spaced at least as wide as said filter is long and with a mouth opening inwardly through which said filter passes in installation at least as wide as said filter is long, said recess being formed by expanding the sidwall of said reservoir in the area of said reservoir recess by forming a matching upwardly, inwardly open female mold recess with a draft permitting removal of said reservoir including said reservoir recess, (c) providing said reservoir recess with a spa water outlet in each of opposed sidewalls of said reservoir recess, and connecting said outlets to pump means connected to a return water line to said reservoir, (d) positioning said filter in said reservoir recess and connecting said filter to said spa water outlets by applying a compressive force to paired opposite outlet ends of said filter and then permitting said filter to expand into engagement and connection with said spa water outlets, and (e) providing said filter with a pervious section between said paired opposite outlet ends whereby a filtered recirculating water stream can be drawn directly from said reservoir through said pervious section and through said spa water outlets.

3. The method of installing a recirculation water filter in a spa having a plastic water reservoir with an open top forming a bathing area, comprising:

(a) molding said plastic water reservoir in a female mold, (b) forming a filter location directly within said water reservoir by forming an upwardly, inwardly open filter-receiving reservoir recess with sidewalls spaced at least as wide as said filter and with a mouth opening inwardly through which said filter passes in installation at least as wide as said filter, said recess being formed by expanding the sidewall of said reservoir in the area of said reservoir recess by forming a matching upwardly, inwardly open female mold recess with a draft permitting removal of said reservoir including said reservoir recess, (c) providing said reservoir recess with filter-engaging elements in each of opposed sidewalls of said recess, and forming at least one of said filter-engaging elements as a spa water outlet and connecting said outlet to pump means connected to a return water line to said reservoir, (d) providing said filter with a pervious section whereby a filtered recirculating water stream can be drawn directly from said reservoir through said pervious section and through said spa water outlet, and (e) positioning said filter in said reservoir recess and securing said filter between said filter-engaging elements.

4. The method of providing a recirculation water filter in a spa having a plastic water reservoir with an open top forming a bathing area, comprising:

(a) molding said plastic water reservoir in a female mold, (b) forming a filter location directly within said water reservoir by forming an upwardly, inwardly open filter-receiving reservoir recess with sidewalls spaced at least as wide as said filter and with a mouth opening inwardly through which said filter passes in installation at least as wide as said filter, said recess being formed by expanding the sidewall of said reservoir in the area of said reservoir recess by forming matching upwardly, inwardly open female mold recesses with a draft permitting removal of said reservoir including said reservoir recess, (c) providing said reservoir recess with a spa water outlet connected to pump means connected to a return water line to said reservoir, (d) positioning said filter in said reservoir recess and connecting said filter to said spa water outlet, and (e) providing said filter with a pervious section and drawing a filtered recirculating water stream directly from said reservoir through said pervious section, through said spa water outlet, and through said return water line back to said reservoir.

5. An installation of an elongated recirculation water filter in a spa having a plastic water reservoir with an open top forming a bathing area, comprising:

(a) a filter station molded directly within said water reservoir by an upwardly, inwardly open filter-receiving reservoir recess expanding the reservoir sidewalls in the area of said reservoir recess, said reservoir and said reservoir recess being configured with drafts permitting female mold release, (b) said reservoir recess having opposed generally parallel sidewalls spaced apart at least as wide as the length of said filter and having an inwardly open mouth through which said filter must pass in installation at least as wide as the length of said filter, and a water outlet fitting disposed in each opposed sidewall of said recess, said fittings being generally horizontally aligned, pump means and lines connecting said fittings to said pump means in a T-manner, and a return water line from said pump means to said reservoir, (c) said filter being positioned in said reservoir recess and having paired end fittings engaged with said water outlet fittings, at least one of said end fittings being spring mounted whereby engagement and disengagement of said end fittings relative to said water outlet fittings can be accomplished by applying a compressive force to the spring mounted end fitting until engagement or disengagement and by then permitting spring release, and (d) said filter having a pervious central section between said end fittings whereby a filtered recirculating water stream can be drawn directly from said reservoir through said pervious section and through said water outlet fittings.

6. An installation of an elongated recirculation water filter in a spa having a plastic water reservoir with an open top forming a bathing area, comprising:

(a) a filter station molded directly within said water reservoir by an upwardly, inwardly open filter receiving reservoir recess expanding the reservoir sidewalls in the area of said reservoir recess, said reservoir and reservoir recess being configured with drafts permitting mold release, (b) said reservoir recess having opposed sidewalls spaced apart at least as wide as the length of said filter and having an inwardly open mouth through which said filter must pass in installation at least as wide as the length of said filter, and a wall fitting disposed in each opposed sidewall of said recess, at least one of said fittings including a water outlet, pump means and means connecting said water outlet to said pump means, and a return water line from said pump means to said reservoir, (c) said filter being positioned in said reservoir recess and having paired end fittings engaged with said wall fittings and in fluid communication with said water outlet, at least one of said end fittings being spring mounted whereby engagement and disengagement of said end fittings relative to said wall fittings can be accomplished by applying a compressive force to the spring mounted end fitting until engagement or disengagement and by then permitting spring recovery, and (d) said filter having a pervious section whereby a filtered water stream can be drawn directly from said reservoir through said pervious section and through said water outlet.

7. An installation of a recirculation water filter in a spa having a plastic water reservoir with an open top forming a bathing area, comprising:

(a) a filter station molded directly within said water reservoir by an upwardly, inwardly open filter receiving reservoir recess expanding the reservoir sidewalls in the area of said reservoir recess, said reservoir and reservoir recess being configured with drafts permitting mold release, (b) said reservoir recess having opposed sidewals spaced apart at least as wide as said filter and having an inwardly open mouth through which said filter must pass in installation at least as wide as said filter, and a wall fitting disposed in each opposed sidewall of said recess, at least one of said fittings including a water outlet, pump means and means connecting said water outlet to said pump means, and a return water line from said pump means to said reservoir, (c) said filter being positioned in said reservoir recess and having paired end fittings interengaging in two sets with said wall fittings and in fluid communication with said water outlet, said filter having spring mounting means whereby engagement and disengagement of said end fittings can be accomplished by applying manual force to the spring mounted means until engagement or disengagement of fittings and by then permitting spring recovery, and (d) said filter having a pervious section whereby a filtered water stream can be drawn directly from said reservoir through said pervious section and through said water outlet.

8. The subject matter of claim 7 in which the sides of said spa are formed by a plastic sheet and each wall fitting includes a first externally threaded sleeve with an end flange and an internally threaded nut threadedly engaged on said sleeve, the plastic sheet in the area of each wall fitting having an opening in which said sleeve is positioned and said flange and said nut being pressed against opposite sides of said plastic sheet, each end fitting including a second sleeve, one of said first and second sleeves having an interiorly threaded outer end and an externally threaded latching thimble engaged therewith and protruding beyond the end of the one sleeve and removably fitting into the other sleeve thereby to removably secure said filter between said wall fittings.

9. The subject matter of claim 8 in which said second sleeve has an end flange and said flanges on said first and second sleeves being radiused to facilitate engagement and disengagement of said latching thimble.

10. The subject matter of claim 8 in which said spring mounting means includes a tube engaged in one end of said filter and secured inside the corresponding second sleeve and a spring compressed between the second sleeve and said one end of said filter, whereby said tube is pressed to slide further into said filter when said spring is manually compressed to engage or disengage said latching thimble.

11. The subject matter of claim 8 in which there is a cover formed of plastic sheet material removably positioned in the mouth of said reservoir recess formed with a side and top wall generally fitting said recess so that the cover in the area of said recess will have generally the same contours as the remainder of the top and side walls of said reservoir, said cover having a pair of flexible flanges with paired openings therein and said second sleeves being positioned in said paired openings and said second sleeve having an end flange and a nut clamping the corresponding flange on said cover therebetween, said flange of said cover in the area of said spring mounting means being spaced from the adjacent wall of said recess sufficiently so the fingers of a user's hand can be inserted into the space to press the corresponding flexible flange of said cover to disengage said thimble.

12. An installation of a recirculation water filter in a spa having a plastic water reservoir with an open top forming a bathing area, comprising:

(a) a filter station molded directly within said water reservoir by an upwardly, inwardly open filter receiving reservoir recess expanding the reservoir sidewalls in the area of said reservoir recess, said reservoir and reservoir recess being configured with drafts permitting mold release, (b) said reservoir recess having opposed sidewalls spaced apart at least as wide as said filter and having an open mouth through which said filter must pass in installation at least as wide as said filter, at least one fitting including a water outlet, pump means and means connecting said water outlet to said pump means, and a return water line from said pump means to said reservoir, (c) said filter being positioned in said reservoir recess and removably connected to said fitting, (d) said filter having a pervious section whereby a filtered water stream can be drawn directly from said reservoir through said pervious section and through said water outlet, and (e) a cover formed of sheet material removably positioned to at least partly close the inwardly open portion of said recess.

* * * * *